United States Patent [19]

Cruz-Uribe

[11] Patent Number: 4,641,153

[45] Date of Patent: Feb. 3, 1987

[54] NOTCHED PIEZO-ELECTRIC TRANSDUCER FOR AN INK JET DEVICE

[75] Inventor: Antonio S. Cruz-Uribe, Cobalt, Conn.

[73] Assignee: Pitney Bowes Inc., Stamford, Conn.

[21] Appl. No.: 772,109

[22] Filed: Sep. 3, 1985

[51] Int. Cl.$^{4}$ .............................................. G01D 15/18

[52] U.S. Cl. .................................. 346/140 R; 310/368

[58] Field of Search .......................... 346/140; 310/368

[56] References Cited

U.S. PATENT DOCUMENTS 3,683,212 8/1972 Zoltan .................................. 310/8.1
3,946,398 3/1976 Kyser et al. ............................ 346/1
4,032,929 6/1977 Fischbeck ........................... 346/140

FOREIGN PATENT DOCUMENTS 2256667 11/1972 Fed. Rep. of Germany .

*Primary Examiner*—Joseph W. Hartary
*Attorney, Agent, or Firm*—Peter Vrahotes; Melvin J. Scolnick; William D. Soltow, Jr.

[57] ABSTRACT

The ink ejecting portion of an ink jet printer is described, wherein a single ceramic transducer is used to create the pressure for the ink droplets. Unlike prior devices, the transducer is a one-piece member as opposed to use of a piezoceramic material and diaphragm. The one-piece member is a piezoceramic material having a notch configuration at the location of each chamber.

7 Claims, 3 Drawing Figures

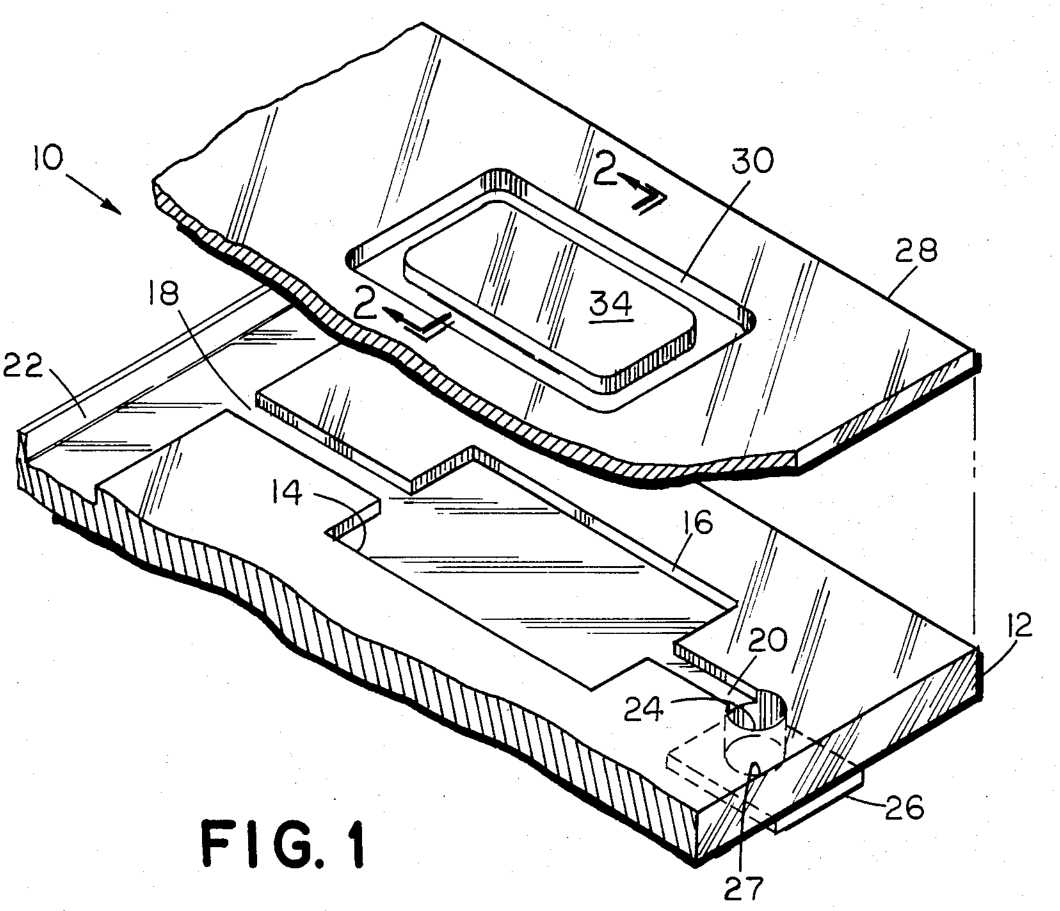
FIG. 1
FIG. 2
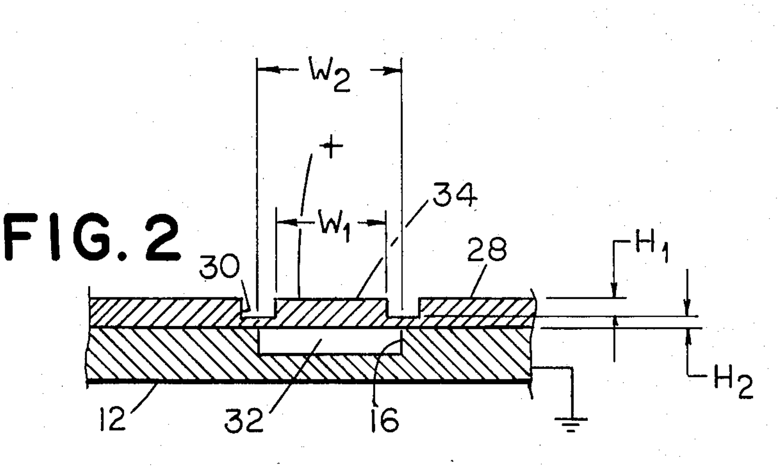
FIG. 3
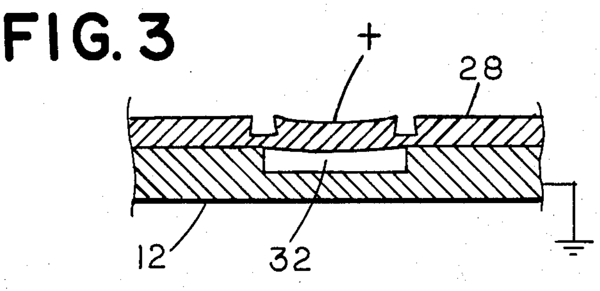

NOTCHED PIEZO-ELECTRIC TRANSDUCER FOR AN INK JET DEVICE

BACKGROUND OF THE INVENTION

Printers and recorders of various types have been developed which employ a stream of ink droplets that are directed upon a print medium. The ink is ejected through a small nozzle as a result of the action of a transducer. A chamber is formed that is partially enclosed by a flexible diaphragm backed by a piezoceramic to form a chamber. A channel leads from the chamber to the opening and another channel leads to the chamber so that ink may be supplied thereto. A small charge is applied to the piezoceramic to alter its length and thereby cause a drop of ink to be ejected from the chamber and out the nozzle. In prior devices, the transducer was composed not only of a piezoceramic but also included a diaphragm layer between the chamber and the piezoceramic. The diaphragms are made of materials such as metal or ceramic. The thicknesses of the layers are selected to achieve the required deflection for a given applied voltage. An example of such a combination is described in U.S. Pat. No. 3,871,004. In another device, the transducer is made of a pair of piezo-electric plates with a conductive film sandwiched between the two plates. Such a device is described in U.S. Pat. No. 3,946,398.

Although prior systems have worked substantially well, improvements are always sought. One goal consistently pursued is to have the nozzles of the ink jet printer as close to one another as possible, in order to obtain higher resolution printing. The barrier in having nozzles close together is the minimum space requirement of each chamber. Various compensatory designs have been developed. One such is to have more rows of nozzles whereby the nozzles are staggered relative to one another. One disadvantage on this approach is that synchronization is required between the enabling of the piezoceramic elements and movement of the medium being printed. Another way of attempting to increase the density of openings is to have canalized chambers as opposed to circular chambers. One problem with this configuration is a reduction in performance. Another approach is to fan out the chambers. The disadvantage with this configuration is that the chambers are further removed from the openings diminishing the emission rate.

In a copending application assigned to the assignee of this application and filed Feb. 11, 1985 with the title "SINGLE ELEMENT TRANSDUCER FOR AN INK JET DEVICE" and Ser. No. 700,582, a one component transducer is described. In this copending application, the transducer has a spherical configuration that is formed.

SUMMARY OF THE INVENTION

Another one component transducer for an ink jet printer has been conceived in addition to that described in said copending application whereby the chamber portion of the ink supply occupies less space. Not only does the present invention provide the advantage of the chamber taking less space, but, in addition, the diaphragm normally associated with the transducer is no longer required. This is accomplished by using a piezoceramic element that has a notched configuration.

Notches may be obtained through cutting or molding techniques.

BRIEF DESCRIPTION OF THE DRAWING

FIG. 1 is an isometric, expanded view of a portion of an ink jet printer fabricated in accordance with the instant invention;

FIG. 2 is a cross-sectional view of an ink chamber of an ink jet print head having a configuration in accordance with the instant invention; and FIG. 3 is a cross-sectional view similar to that in FIG. 2 showing the configuration of the diaphragm upon being pulsed.

DETAILED DESCRIPTION OF THE PREFERRED EMBODIMENT

Referring now to the drawing, one of the chamber portions of an ink jet print head is shown generally at 10 and includes a plate 12 having a cavity 14 therein. The cavity 14 has a wall 16 having a height of approximately 0.150 inches and channels 18 and 20 extending from the cavity in opposite directions. The first channel 18 is confluent with an ink supply manifold 22, the manifold being in communication with a central ink reservoir (not shown). In this way, ink may be supplied to the cavity 14. The second channel 20 is confluent with a nozzle 24 that forms an orifice in the plate 12. A cover 26 is located on the plate 12 at the nozzle 24 and has a corresponding opening 27. Secured to the plate 12 is a piezoceramic sheet 28 that has a notch or groove 30 that is generally aligned with the walls 16 of the cavity 14. The piezoceramic sheet in cooperation with the cavity 14 forms a chamber 32. As used in this description and accompanying claims, the terms notch or notched configuration are intended to define a continuous groove formed within a flat surface such as the plate 12.

Only one chamber 32 is shown and described; however, it will be appreciated that a plurality of aligned chambers are located along the plate 12. The plate 12 is grounded and a positive voltage is supplied to the surface 34 located within the notch 30.

When a voltage of the proper polarity is applied to a piezoceramic sheet 28, the voltage causes the piezoceramic to bend to reduce the volume of this chamber 32. This is the result of the piezoceramic sheet 28 wanting to shorten, but because it is securely attached to the plate 12 it cannot, so it will contract into the chamber area 32. As the piezoceramic material goes into tension as a result of the voltage, because of the presence of the notches 30, the surface 32 will be forced to reduce the volume in the chamber 32 as seen in FIG. 3. This will cause the ink to be ejected out of the channel 20 and through the orifice 27. This is repeated a number of times and at least 5,000 cycles per second may be achieved.

The advantage of the instant invention is two-fold. The first advantage is that a diaphragm is no longer required, thereby saving a considerable amount of time in manufacturing and expense. In addition to that, it has been found that a smaller cavity 14 is required. This leads to the advantage of requiring less space for the chamber 32 so that the nozzles 24 along the length of the plate 12 of the ink jet printer may be closer together without having to resort to the types of configuration that were used in prior art systems. As a consequence, when a sheet is conveyed in front of the plate 12, the density of the dots that may be printed on the sheet will be increased with a resulting improvement in printing quality. As shown in FIG. 3, the surface is directed toward the cavity 32 when a positive charge is applied to the crystal 28.

In the matter of fabrication of the piezoceramic sheet 28 it may be advantageous to mold the sheet with the notch therein or to cut the notched portion 32 from a flat plate. Preferably the ratio of the width $W_1$ of the surface 34 to the distance $W_2$ between the midpoints of the notches is equal to 0.6, i.e. $W^1/W^2=0.6$. Preferably, the ratio of the height $h_1$ of the notch to the distance $h_2$ as measured from the bottom of the notch 30 to the bottom of the plate 12 also equals 0.6, i.e. $h_1/h_2=0.6$.

Although the chamber 32 is shown as having a generally rectangular configuration, it will be appreciated that other configurations, such as a circular or pentagonal, may be used as well with corresponding groove 30 configurations.

What is claimed is:

1. Ink ejecting portion of an ink jet print head, comprising:
- a plate;
- a cavity in said plate;
- a first channel in said plate extending from said said cavity;
- a manifold confluent with said first channel;
- a second channel in said plate extending from said cavity;
- an opening in said plate confluent with said second channel; and
- a piezoceramic sheet disposed upon said plate and extending over said cavity to form a chamber therewith, said piezoceramic sheet having a notched configuration in the vicinity of the walls of said cavity.

2. The device of claim 1 including means for supplying a charge to said piezoceramic sheet between said notched configuration.

3. The device of claim 1 wherein the ratio of the surface of said plate between said notched portion of said piezoceramic sheet and the distance between midpoints of opposed notched portions is equal to 0.6.

4. The device of claim 3 wherein the ratio of the height of said notched configuration relative to the distance from the bottom of said notched configuration and the bottom of said plate is equal to 0.6.

5. An ink ejecting portion of an ink jet printer, comprising:
- a plate;
- a cavity in said plate;
- a first channel in said plate extending from said said cavity;
- a manifold confluent with said first channel;
- a second channel in said plate extending from said cavity;
- an opening in said plate confluent with said second channel; and
- a piezoceramic sheet disposed upon said plate and extending over said cavity to form a chamber therewith, said piezoceramic sheet having a notch configuration in the vicinity of said cavity.

6. The device of claim 5 wherein said notch configuration is generally rectalinear and is generally aligned with the walls of said cavity.

7. The device of claim 4 including means for supplying a charge to the portion of said piezoceramic sheet intermediate said notch configuration.

* * * * *